N. BERGERON.
COMBINED ELECTRIC HEATER AND BOILER.
APPLICATION FILED JUNE 8, 1917.
1,258,642.
Patented Mar. 12, 1918.
3 SHEETS—SHEET 3.
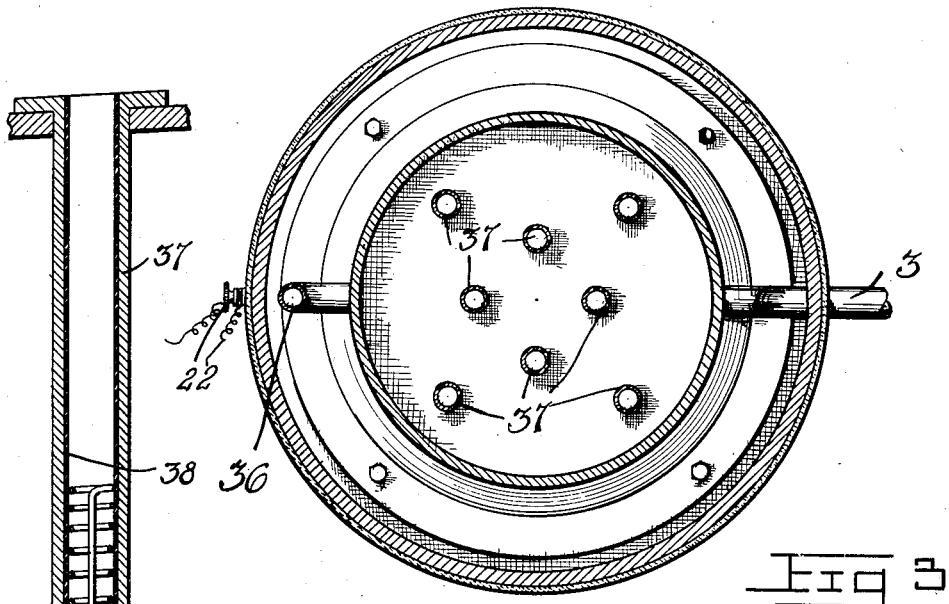
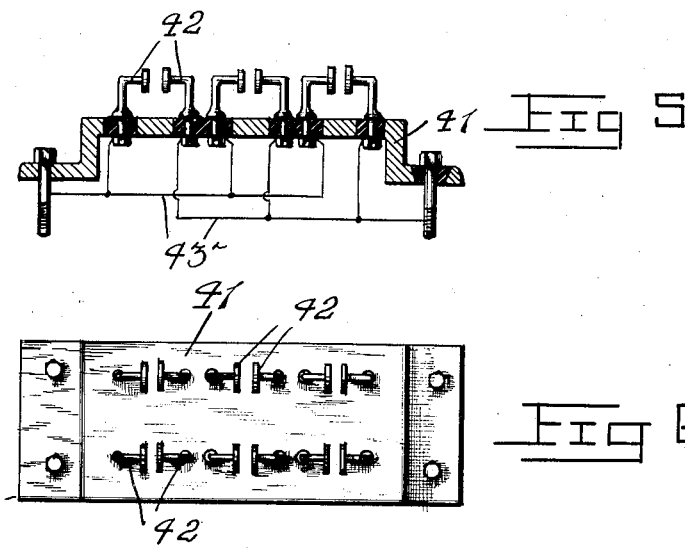
Inventor
Napoléon Bergeron

UNITED STATES PATENT OFFICE.

NAPOLÉON BERGERON, OF MONTREAL, QUEBEC, CANADA, ASSIGNOR OF TWENTY-EIGHT ONE-HUNDREDTHS TO JOSEPH U. GERVAIS, TWENTY ONE-HUNDREDTHS TO DONAT VALIQUETTE, AND SIXTEEN ONE-HUNDREDTHS TO AVILA A. LORTIE, ALL OF MONTREAL, QUEBEC, CANADA.

COMBINED ELECTRIC HEATER AND BOILER.

1,258,642.    Specification of Letters Patent.    Patented Mar. 12, 1918.

Application filed June 8, 1917.   Serial No. 173,495.

*To all whom it may concern:*

Be it known that I, NAPOLÉON BERGERON, a subject of the King of Great Britain, residing at Montreal, Province of Quebec, Canada, have invented certain new and useful Improvements in Combined Electric Heaters and Boilers; and I do hereby declare that the following is a full, clear, and exact description of the invention, such as will enable others skilled in the art to which it appertains to make and use the same.

The present invention relates to a generating system and more particularly to an electric heater to be used in connection therewith, and an object of the present invention is to provide a heater of this character whereby steam may be generated and the steam so generated will be supplied to a motor for actuating the generating apparatus, whereby electricity will be generated and subsequently supplied to the heater.

With the above and other objects in view which will hereinafter appear as the description continues, the invention consists of the novel features of construction, combination and formation of parts as will be hereinafter more fully described and particularly pointed out in the appended claims.

In the accompanying drawings has been shown the simple and preferred form of the invention, it being, however, understood that no limitation is necessarily made to the precise structural details herein exhibited, but the right is hereby reserved to any changes, alterations or modifications to which recourse may be had that come within the scope of the claims without departing from the spirit of the invention or sacrificing the efficiency of the same.

In the accompanying drawings:

Fig. 3 is a horizontal section taken on the line 3—3 of Fig. 2;

Fig. 4 is a vertical section through one of the heating tubes;

Fig. 5 is a detail vertical section through the auxiliary electric heater; and,

Fig. 6 is a plan view of the same.

Referring now more particularly to the accompanying drawings wherein like and corresponding parts are designated by similar reference characters throughout the several views.

Figure 1:
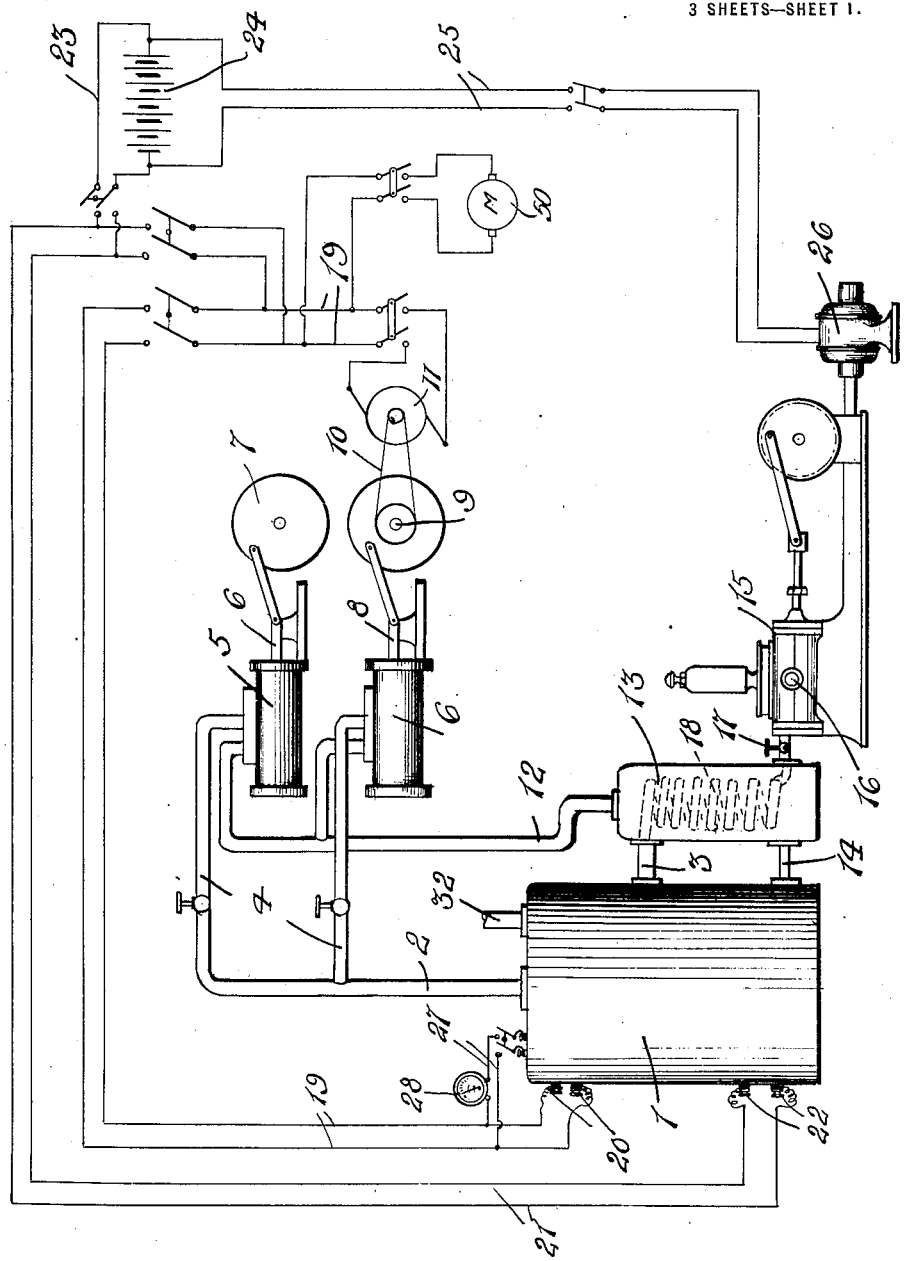
Figure 1 is a diagrammatical representation of the system embodying the present invention.

The numeral 1 indicates a boiler or steam generator having an outlet pipe 2 leading therefrom and a water supply pipe 3 leading thereto. The steam supply pipe 2 has connected thereto the branches 4 which supply steam to the steam chest of the motors 5 and 6 respectively. The piston rod of the motor 5 is suitably connected to a revolving wheel 7 whereby suitable work may be performed by the motor 5. The piston rod 8 of the motor 6 is also suitably connected to a revolving shaft 9 and this shaft is connected by means of the belt 10 to a generator 11, whereby when the motor 6 is set in operation the generator 11 will also be caused to operate or generate electricity. Leading from the motors 5 and 6 are the exhaust pipes whereby the exhaust steam from the motors may pass into the pipe 12 and from this pipe 12 into the tank 13. Leading from this tank 13 is a pipe 14 which permits the exhaust steam from the motors to enter the boiler 1 as will later be described. A water pump 15 is provided having an inlet 16 leading thereto and an outlet 17 which is in communication with the pipe 3 by means of the coil 18 arranged within the tank 13. In this manner it is obvious that as a fresh supply of cold water is forced within the boiler 1 it will be pre heated by means of the exhaust steam coming from the motors 5 and 6. The generator 11 is arranged in an electric circuit 19 and also arranged in this circuit 19 are the terminals 20 which are electrically connected with an auxiliary heater arranged within the tank 1. A second circuit 21 has arranged in circuit therewith the terminals 22 and the latter terminals are electrically connected to the main heaters arranged within the tank 1. The circuits 19 and 21 are also electrically connected, and electrically connected to the circuit 21 is a third circuit 23 having a storage battery 24 included therein and leading from this storage battery are the wires 25 which are connected to the motor 26. This motor 26 is for driving the water pump 15. An auxiliary circuit 27 is connected to the circuit 19 and has arranged therein a depth gage, which consists of an ammeter 28, and the latter will be hereinafter more fully described.

From the foregoing it is obvious that the steam generated within the tank 1 will be supplied to the motors 5 and 6 whereby the motor 5 may perform work and the motor 6 will cause the generator 11 to be brought into use for supplying current direct to the terminals 20 and 22 or the current may be supplied to the batteries 24, so that the motor 26 may be brought into operation for pumping an additional supply of water for the tank 1 when necessary. The various circuits herein mentioned have switches arranged therein as shown, whereby the circuits may be connected or disconnected as the case may require.

Figure 2:
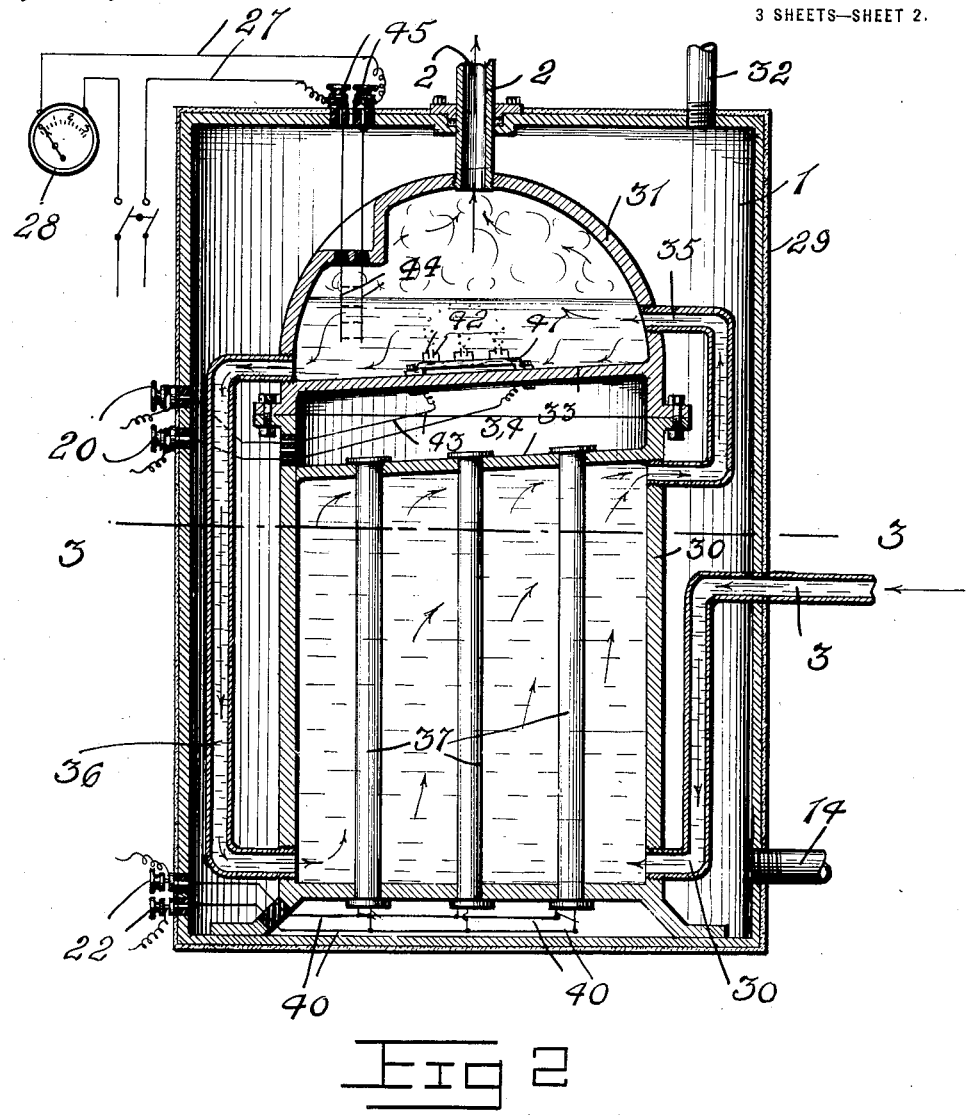
Fig. 2 is a vertical section through the steam boiler or generator.

The steam generator or tank 1 comprises a cylindrical casing which is covered by a suitable insulating material 29. Arranged within this tank is a hollow casing comprising a lower section 30 and an upper section 31 which are connected together. Communicating with the lower end of the section 30 is the inlet pipe 3 and connected to the section 31 is the steam outlet pipe 2. This auxiliary casing is arranged in spaced relation within the tank 1 so that the exhaust steam entering the tank 1 through the pipe 14 may circulate around this casing and finally exhaust through the exhaust pipe 32 and in this manner the exhaust steam may also be utilized for heating the water contained within the casing. The upper end of the section 30 and the lower end of the section 31 have arranged therein the partitions 33 forming a chamber 34 when the sections are connected and the sections 30 and 31 are connected by means of the U-shaped pipe 35. The chamber 34 provides a heat accumulator in which the heat arising from the tubes 37 may accumulate, for greatly increasing the temperature of the water within the compartment 31. These sections 30 and 31 are also in communication by means of the return pipe 36. Arranged within the section 30 are the vertically extending tubes 37 which are internally lined with a suitable insulating material 38 and arranged within these tubes 37 are the coils 39 and these coils 39 are connected to the terminals 22 by means of the wires 40. In this manner as current is supplied to the tubes 37 the water contained within the section 30 will be heated and as this water is heated it will be caused to raise in the direction of the arrows as shown in Fig. 2 of the drawings, where it will pass through the pipe 35 into the upper section 31. The water contained within the upper section 31 which has not been transformed into steam will pass down through the pipe 36 into the section 30 where it will again be heated. The heat from the coils 39 will also rest within the chamber 34, whereby this heat will assist in heating the water contained within the upper section 31. Arranged upon the upper face of the partition 33 within the upper section 31 is a plate 41 having a plurality of terminals 42 arranged thereupon and which terminals are arranged in pairs and each pair being in spaced relation to form a gap therebetween. These terminals 42 are connected by means of the wires 43 to the terminals 20, so that when current is supplied to these terminals 42 and water is contained within the section 31 the water will act as a resistance between the gaps formed between each pair of terminals 42, thereby providing a heater for heating the water contained within the section 31. Depending within the section 31 are the wires 44 which are connected to the terminals 45 and the latter are included within the circuit 27. In this manner as the water raises within the section 31 the terminals arranged between the wires 44 will be separated, thereby offering less resistance to the ammeter 28 and in this manner the ammeter 28 will register the depth of the water contained within the section 31.

The numeral 50 indicates a generator included in an electric circuit which is a source of electric power to be supplied to the electric circuits in starting the electric heater and which may also be used for regenerating the battery 24.

Having thus fully described my invention, what I claim as new and desire to secure by Letters Patent is:

1. A combined electric heater and boiler comprising a casing, a plurality of tubes arranged within said casing having their opposite ends open, heating coils arranged within said tubes, a heat retaining compartment communicating with the upper ends of said tubes, and means whereby water may circulate within said casing around said tubes and above said compartment substantially as and for the purpose specified.

2. A combined electric heater and boiler comprising a casing, a plurality of tubes arranged within said casing having their opposite ends open, heating coils arranged within said tubes, a compartment arranged above and connected with the upper ends of said tubes, an auxiliary heater arranged upon said compartment, the upper face of said compartment being inclined toward one side thereof and means whereby water may circulate around said tubes and compartment for the purpose set forth.

3. A combined electric heater and boiler comprising a tank, a casing arranged therein, said casing comprising an upper and lower section, partitions for separating said sections forming a chamber therebetween, a plurality of vertical tubes arranged within the lower section having their upper ends communicating with said chamber, electric heating coils arranged within said tubes, an auxiliary heater arranged upon the partition of the upper section, means of communication between said sections, the lower section having a water inlet and the upper section having an outlet leading therefrom substantially as and for the purpose specified.

In witness whereof I have hereunto set my hand.

NAPOLÉON BERGERON.